(12) United States Patent
Lee et al.

(10) Patent No.: US 12,361,743 B2
(45) Date of Patent: *Jul. 15, 2025

(54) FINGER DETECTION DEVICE AND OPERATING METHOD THEREOF

(71) Applicant: PixArt Imaging Inc., Hsin-Chu County (TW)

(72) Inventors: Yu-Ju Lee, Hsin-Chu County (TW); Tzung-Min Su, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,129

(22) Filed: Apr. 30, 2024

(65) Prior Publication Data

US 2024/0386741 A1 Nov. 21, 2024

Related U.S. Application Data

(63) Continuation of application No. 18/318,723, filed on May 17, 2023, now Pat. No. 12,014,567.

(51) Int. Cl.
| | |
|---|---|
| *G06V 40/13* | (2022.01) |
| *G06V 40/12* | (2022.01) |
| *H04N 23/71* | (2023.01) |
| *H04N 23/72* | (2023.01) |
| *H04N 23/73* | (2023.01) |
| *H04N 23/74* | (2023.01) |
| *H04N 25/50* | (2023.01) |
| *G06V 40/10* | (2022.01) |

(52) U.S. Cl.
CPC .......... *G06V 40/13* (2022.01); *G06V 40/1353* (2022.01); *H04N 23/71* (2023.01); *H04N 23/72* (2023.01); *H04N 23/73* (2023.01); *H04N 23/74* (2023.01); *H04N 25/50* (2023.01); *G06V 40/15* (2022.01)

(58) Field of Classification Search
CPC .... G06V 40/13; G06V 40/1353; G06V 40/15; G06V 10/141; G06V 40/1318; G06V 40/1335; H04N 23/71; H04N 23/72; H04N 23/73; H04N 23/74; H04N 25/50
See application file for complete search history.

(56) References Cited

U.S. PATENT DOCUMENTS

| | | | |
|---|---|---|---|
| 2014/0111482 A1* | 4/2014 | Kao | G06F 3/0421 345/175 |
| 2016/0242657 A1* | 8/2016 | Wang | H04N 23/56 |
| 2021/0004562 A1* | 1/2021 | Chiang | G06V 40/45 |
| 2021/0149029 A1* | 5/2021 | Shiokawa | H04N 23/73 |

* cited by examiner

*Primary Examiner* — Premal R Patel
(74) *Attorney, Agent, or Firm* — WPAT, PC

(57) ABSTRACT

There is provided a finger detection device including a light source, a light sensor and a processor. The light sensor respectively captures a first image frame and a second image frame corresponding to turning on and turning off the light source. The processor calculates a differential image frame of the first image frame and the second image frame, determines a covered region in the differential image frame and identifies whether the covered region is a finger region or not. If the covered region is not the finger region, the processor controls the light sensor to acquire new image frames. If the covered region is the finger region, the processor determines different windows of interest in the finger region.

20 Claims, 6 Drawing Sheets

FINGER DETECTION DEVICE AND OPERATING METHOD THEREOF

CROSS-REFERENCE TO RELATED APPLICATIONS

The present application is a continuation application of U.S. application Ser. No. 18/318,723, filed on May 17, 2023, the disclosure of which is hereby incorporated by reference herein in its entirety.

FIELD OF THE DISCLOSURE

This disclosure generally relates to processing a finger image and, more particularly, to a finger detection device and an operating method thereof that remove noises of a non-finger region from an image frame, and determine different windows of interest corresponding to different control functions.

BACKGROUND OF THE DISCLOSURE

The finger detection can be applied to different control functions of an electronic device. Generally, an optical finger detection device acquires an image frame using an image sensor, and processes the image frame using a processor to obtain image processing results required by various control functions.

However, when the finger detection is performed upon a finger not being in contact with a sensing surface or only a part of a finger surface being in contact with the sensing surface, the detection result is unstable and the identification accuracy is degraded. In addition, because different control functions require different features in the image frame, the processor generally cannot use the same image frame to obtain suitable image features required by different control functions.

Therefore, conventionally if an electronic device is required to execute different control functions using the finger image, a time division method is required to capture different image frames using different image capturing parameters so as to be adapted to the image processing of different control functions.

However, capturing image frames within different time intervals and using different image capturing parameters can decrease a response time of the system to lower the user experience.

Accordingly, the present disclosure provides a finger detection device and an operating method that dynamically determine windows of interest in an image frame so as to remove noises caused by non-finger images in the image frame. Because different windows of interest allow the same image frame to be adaptable to the image processing of different control functions, image frames acquired at different times using different image capturing parameters are no longer required such that the response time is improved.

SUMMARY

The present disclosure provides a finger detection device and an operating method thereof that determine different windows of interest in the same image frame corresponding to different control functions so as to obtain high accuracy to the different control functions.

The present disclosure provides a finger detection device including a light source, a light sensor and a processor. The light source is configured to emit light toward a sensing surface of the finger detection device. The light sensor is configured to acquire a first image frame and a second image frame toward the sensing surface. The processor is configured to calculate a difference of the first image frame and the second image frame to generate a differential image frame, identify a finger region in the differential image frame, and determine different windows of interest (WOIs) corresponding to different functions upon identifying the finger region.

The present disclosure further provides an operating method of a finger detection device. The finger detection device includes a light source, a light sensor and a processor. The operating method includes the steps of: acquiring, using the light sensor, a first image frame and a second image frame corresponding to different illuminations of the light source; identifying, using the processor, a predetermined material of a covered region in a differential image frame of the first image frame and the second image frame; performing a fingerprint detection function and a PPG detection function according to the covered region in the same differential image frame upon identifying the predetermined material.

The present disclosure provides a finger detection device including a light source, a light sensor and a processor. The light source is configured to emit light toward a sensing surface of the finger detection device. The light sensor is configured to acquire a first image frame and a second image frame toward the sensing surface. The processor is configured to calculate a difference of the first image frame and the second image frame to generate a differential image frame, identify a finger region in the differential image frame, and output different amount of pixel data of image frames acquired by the light sensor corresponding to different functions upon identifying the finger region.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide an electronic device that performs different control functions using the same image frame. Because different control functions of the electronic device have different requirements on image features, the finger detection device of the present disclosure selects different (e.g., including different numbers, sizes, locations, shapes or the like) windows of interest (WOIs) in a same image frame corresponding to different control functions to allow the same image frame to be adapted to different control functions of the electronic device.

Figure 1:
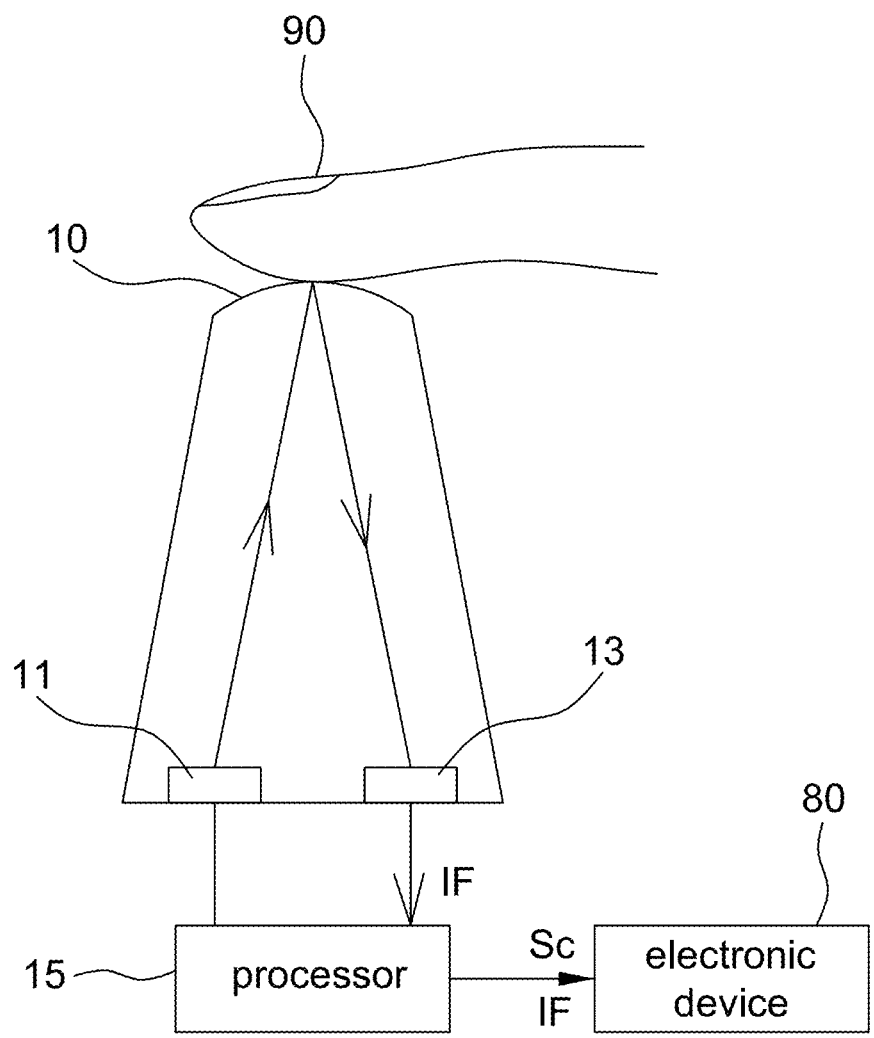
FIG. 1 is a schematic diagram of a finger detection device according to one embodiment of the present disclosure and an electronic device using the same.

Please refer to FIG. 1, it is a schematic diagram of a finger detection device 100 of the present disclosure and an electronic device 80 using/coupled to the finger detection device 100. In one aspect, the finger detection device 100 is embedded in the electronic device 80. In another aspect, the finger detection device 100 is separated from the electronic device 80 but electrically or wirelessly coupled to the electronic device 80. The electronic device 80 is a device capable of performing finger control such as a smart phone, a notebook computer, a desktop computer, a tablet computer, a work station, a vehicle central control system, but not limited to.

The finger detection device 100 includes a sensing surface 10, a light source 11, a light sensor 13 and a processor 15. In some aspects, the finger detection device 100 further includes optics (e.g., lens) to adjust light paths to improve the sensing efficiency.

The light source 11 is a coherent light source or a non-coherent light source, e.g., including a light emitting diode and a laser diode. The light source 11 emits light with an identifiable spectrum toward the sensing surface 10 to illuminate a finger 90 put on the sensing surface 10. If the finger 90 is not put on the sensing surface 10, light from the light source 11 goes through the sensing surface 10. Whether the sensing surface 10 is totally covered by the finger 90 will determine amount of ambient light entering the sensing surface 10 and affecting the detection performance of the finger detection device 100.

The light sensor 13 is a CMOS image sensor or a CCD image sensor without particular limitations. The light sensor 13 receives light from (reflected or penetrating) the sensing surface 10 to generate image frames IF with a predetermined exposure time and a predetermined frequency.

The processor 15 is, for example, a digital signal processor (DSP), an application specific integrated circuit (ASIC), a field programmable gate array (FPGA) or the like. The processor 15 is coupled to the light source 11 and the light sensor 13 to activate and deactivate the light source 11 and the light sensor 13. For example, the processor 15 controls the light sensor 13 to acquire a first image frame IF1 and a second image frame IF2, referring to FIG. 3, corresponding to different illuminations of the light source 11. For example, the light source 11 is turned on when the light sensor 13 is acquiring the first image frame IF1, and the light source 11 is turned off when the light sensor 13 is acquiring the second image frame IF2.

Figure 2:
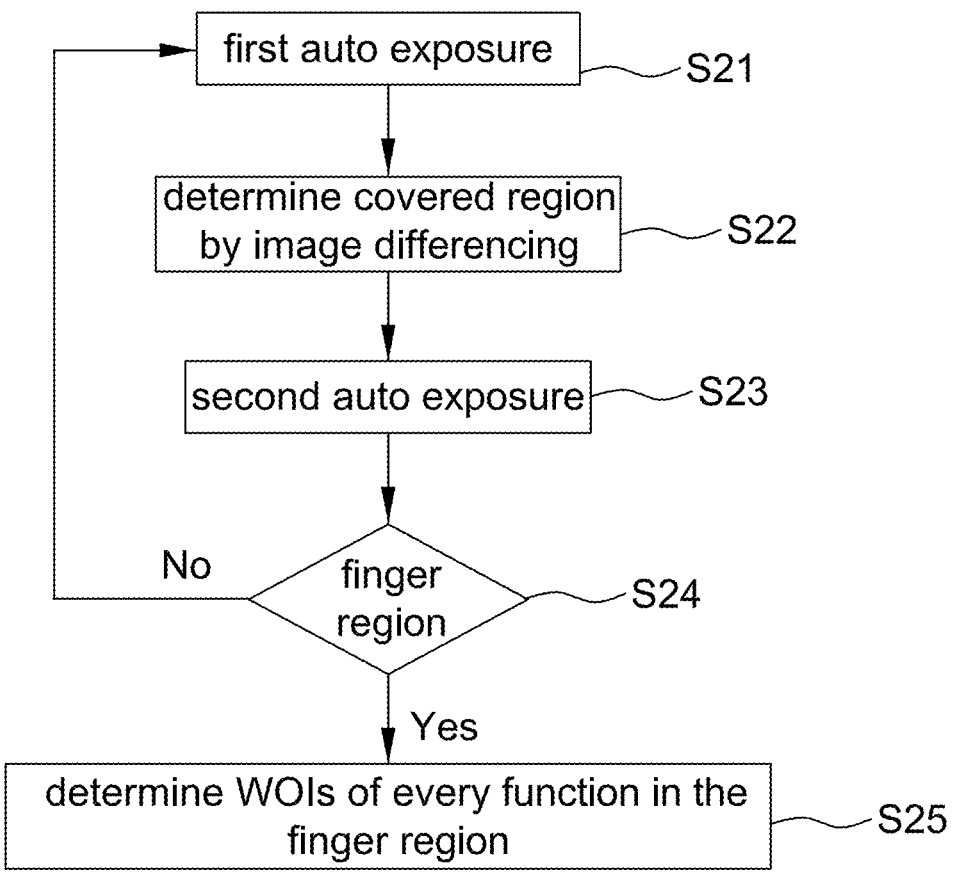
FIG. 2 is a flow chart of an operating method of a finger detection device according to one embodiment of the present disclosure.
Figure 3:
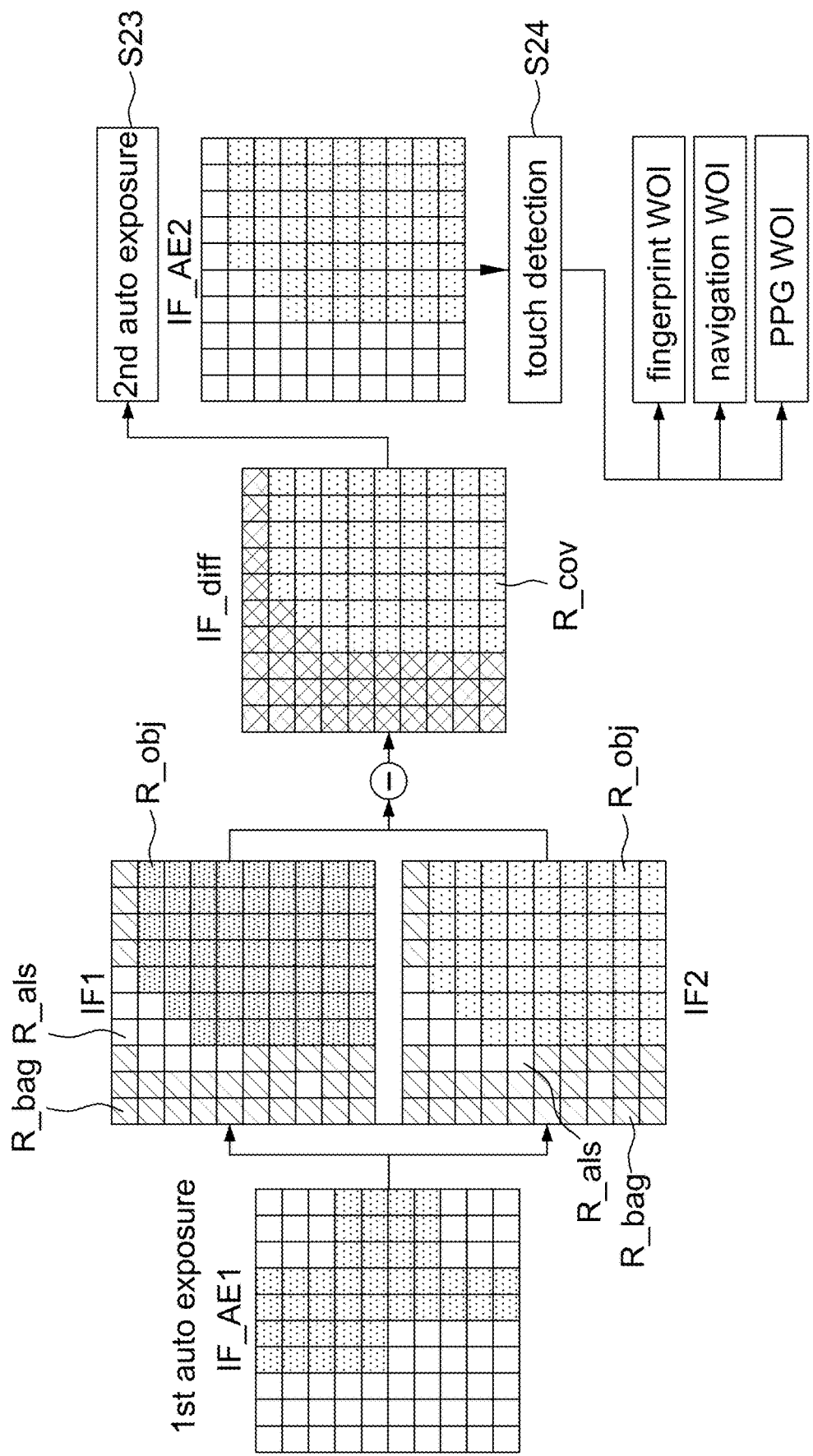
FIG. 3 is a schematic diagram of an operating method of a finger detection device according to one embodiment of the present disclosure.

Please refer to FIGS. 2 and 3, FIG. 2 is a flow chart of an operating method of a finger detection device 100 according to one embodiment of the present disclosure; and FIG. 3 is a schematic diagram of an operating method of a finger detection device 100 according to one embodiment of the present disclosure. The operating method of the finger detection device 100 includes the steps of: performing first auto exposure (Step S21): determining a covered region by image differencing (Step S22); performing second auto exposure (Step S23); identifying whether the covered region is a finger region (Step S24); and determining WOIs of every function in the finger region (Step S25). In this embodiment, the functions include control functions using a finger such as a fingerprint detection, a navigation detection and a photoplethysmography (PPG) detection, but the present disclosure is not limited thereto.

Please refer to FIG. 3 at the same time, details of the present operating method are described hereinafter.

Step S21: Firstly, the processor 15 performs a first auto exposure according to an image frame IF_AE1 (e.g., shown by a 10×10 pixel array, but not limited to; a number of pixels being determined according to the pixel array actually being used) acquired by the light sensor 13. The first auto exposure is to cause the brightness or average brightness of the image frame IF_AE1 to be suitable for post-processing, e.g., not too bright or too dark to cause a part of image features unable to be recognized. In one aspect, the processor 15 selects multiple pixels (e.g., shown by 42 pixels filled with dots, but not limited to 42 pixels) having the largest brightness in the image frame IF_AE1 to perform the first auto exposure. In another aspect, the processor 15 selects multiple pixel blocks (each having multiple pixels) having the largest brightness in the image frame IF_AE1 to perform the first auto exposure. After the first auto exposure finished, i.e. the image frame IF_AE1 having suitable brightness, the Step S22 is entered.

Step S22: Next, the processor 15 controls the light sensor 13 to respectively capture a first image frame IF1 and a second image frame IF2 corresponding to the light source 11 being turned on and turned off (not limited to be turned off, but illuminating with lower brightness). As shown in FIG. 3, the first image frame IF1 and the second image frame IF2 respectively contain an ambient light region (blank region) R_als, a background region (tilted lines region) R_bag and an object covered region (dotted region) R_obj. The processor 15 calculates a difference of the first image frame IF1 and the second image frame IF2 to generate a differential image frame IF_diff to remove interference from the ambient light region R_als and the ambient light region R_als. Because a cover (i.e. finger 90) is illuminated by different light intensity, the difference between two object covered regions R_obj has higher pixel gray levels. Therefore, the processor 15 determines a covered region R_cov, which is corresponding to the object covered region R_obj, in the differential image frame IF_diff. In one aspect, the processor 15 takes a pixel region in the differential image frame IF_diff having pixel gray levels larger than a differential threshold (determined and recorded in a memory before shipment for being accessed by the processor 15) as the covered region R_cov. That is, the processor 15 is embedded with an algorithm (implemented by software, firmware and/or hardware) to identify the covered region R_cov.

In another aspect, the processor 15 controls the light sensor 13 to acquire the first image frame IF1 and the second image frame IF2 using a first exposure time, and to acquire another first image frame and another second image frame using a second exposure time, different from the first exposure time (e.g., double of the first exposure time, but not limited to). The processor 15 calculates a first differential image frame of the first image frame IF1 and the second image frame IF2, calculates a second differential image frame of the another first image frame and the another second image frame, and calculates a weighted summation of the first differential image frame and the second differential image frame (e.g., first differential image frame+ second differential image frame×½) as the differential image frame IF_diff. The processor 15 then identifies a covered region R_cov in this differential image frame IF_diff.

In a further aspect, the processor 15 controls the light sensor 13 to acquire the first image frame IF1 and the second image frame IF2 using a first exposure time. The processor 15 calculates a first differential image frame of the first image frame IF1 and the second image frame IF2, decreases (corresponding to over-exposure) or increases (corresponding to under-exposure) the first exposure time to a second exposure time to acquire another first image frame and another second image frame upon identifying that the first differential image frame has the over-exposure or the under-exposure, and calculates a second differential image frame of the another first image frame and the another second image frame as the differential image frame IF_diff. The processor 15 then identifies a covered region R_cov in this differential image frame IF_diff.

In other words, the differential image frame IF_diff of the present disclosure is obtained by differencing one set of image frames or by weighted summing multiple differential image frames corresponding to multiple exposure times to so as to avoid the over-exposure or the under-exposure.

Step S23: To eliminate the interference from ambient information (e.g., including ambient light region R_als and background region R_bag), the processor 15 further controls the light sensor 13 to perform a second auto exposure according to pixel gray levels in the covered region R_cov (e.g., shown as gray levels of 60 pixels at lower-right corner of the image frame IF_AE2, but not limited to 60 pixels) but ignoring pixel gray levels outside (blank region in IF_AE2) the covered region R_cov. In FIG. 3, the image frame IF_AE2 indicates an image frame for performing the second auto exposure according to the covered region R_cov after the covered region R_cov is determined in the differential image frame IF_diff. It is seen from FIG. 3 the first auto exposure and the second auto exposure is performed based on different pixels, but not limited to.

In one aspect, the Step S23 is optional, and the processor 15 directly uses the differential image frame IF_diff to perform the subsequent processes without performing the second auto exposure.

Step S24: Then, the processor 15 identifies whether the covered region R_cov has a predetermined material or not, e.g., a finger surface or a glove surface (worn on the finger). For example, the processor 15 identifies whether the covered region R_cov has the predetermined material (i.e. the finger region) according to at least one of a maximum brightness, a standard deviation of brightness, a maximum difference of brightness, a standard deviation of brightness difference and a maximum spectral power of multiple pixel blocks (each having at least one pixel) in the covered region R_cov. For example, the maximum brightness is larger than or equal to a threshold or within a threshold range; the standard deviation of brightness is smaller than or equal to a threshold or within a threshold range; the maximum difference of brightness is smaller than or equal to a threshold or within a threshold range; the standard deviation of brightness difference is smaller than or equal to a threshold or within a threshold range; and the maximum spectral power is larger than or equal to a threshold or within a threshold range, but not limited to. When identifying that the covered region R_cov does not have the predetermined material, the finger detection device 100 does not output the image frame (e.g., image frame before or after differencing) and returns to the Step S21. When identifying that the covered region R_cov has the predetermined material, it means that a user's finger 90 has been put on the sensing surface 10 and the finger detection device 100 performs the subsequent processes, e.g., outputting the image frame (e.g., image frame before or after differencing), informing the electronic device 80 to perform touch control or other control functions via a control signal Sc.

When the processor 15 uses multiple features (e.g., the maximum brightness, standard deviation of brightness, maximum difference of brightness, standard deviation of brightness difference and maximum spectral power mentioned above) to identify the predetermined material of the covered region R_cov, the processor 15 is embedded with an identification function (implemented by software and/or firmware). The processor 15 inputs the above multiple features into the identification function to identify whether the covered region R_cov has the predetermined material, which is defined by the identification function.

Step S25: When the covered region R_cov has the predetermined material (i.e., belong to a finger region), the processor 15 determines different windows of interest (WOIs) corresponding to different functions according to the covered region R_cov of the same differential image frame (e.g., acquired after the second auto exposure) to allow the electronic device 80 to perform different detection/control functions, wherein said different functions include a fingerprint detection function, a navigation detection function and a PPG detection function, but not limited to.

For example, in the fingerprint detection, the processor 15 determines (compared with predetermined thresholds) at least one corresponding WOI according to at least one of a number of minutiae, a directional spectrum and a spatial frequency value in the finger region. That is, the processor 15 determines the WOI(s) in the finger region according to the image feature required in the fingerprint recognition, e.g., region having clear fingerprint feature. Pixel data and/or information of the determined at least one WOI are sent to the electronic device 80.

For example, in the navigation detection, the processor 15 determines (compared with predetermined thresholds) at least one corresponding WOI according to at least one of a standard deviation of brightness and power of a specific spatial spectrum in the finger region. That is, the processor 15 determines the WOI(s) (e.g., region for calculating correlation easily) in the finger region according to the image feature required in the navigation calculation (e.g., calculating displacement using the correlation). Pixel data and/or information of the determined at least one WOI are sent to the electronic device 80.

For example, in the PPG detection, the processor 15 determines (compared with predetermined thresholds) at least one corresponding WOI according to at least one of an average brightness, a standard deviation of brightness in time-domain and a spectral power of brightness in time-domain in the finger region. That is, the processor 15 determines the WOI(s) in the finger region according to the image feature required in the heartbeat or blood oxygen level calculation, e.g., region having high signal-to-noise ratio, e.g., adjacent to blood vessels. Pixel data and/or information of the determined at least one WOI are sent to the electronic device 80.

The at least one WOI determined corresponding to different control functions are identical to or different from each other according to image frames being captured.

Corresponding to different functions, the processor 15 determines a single WOI or multiple WOIs.

Figure 4A:
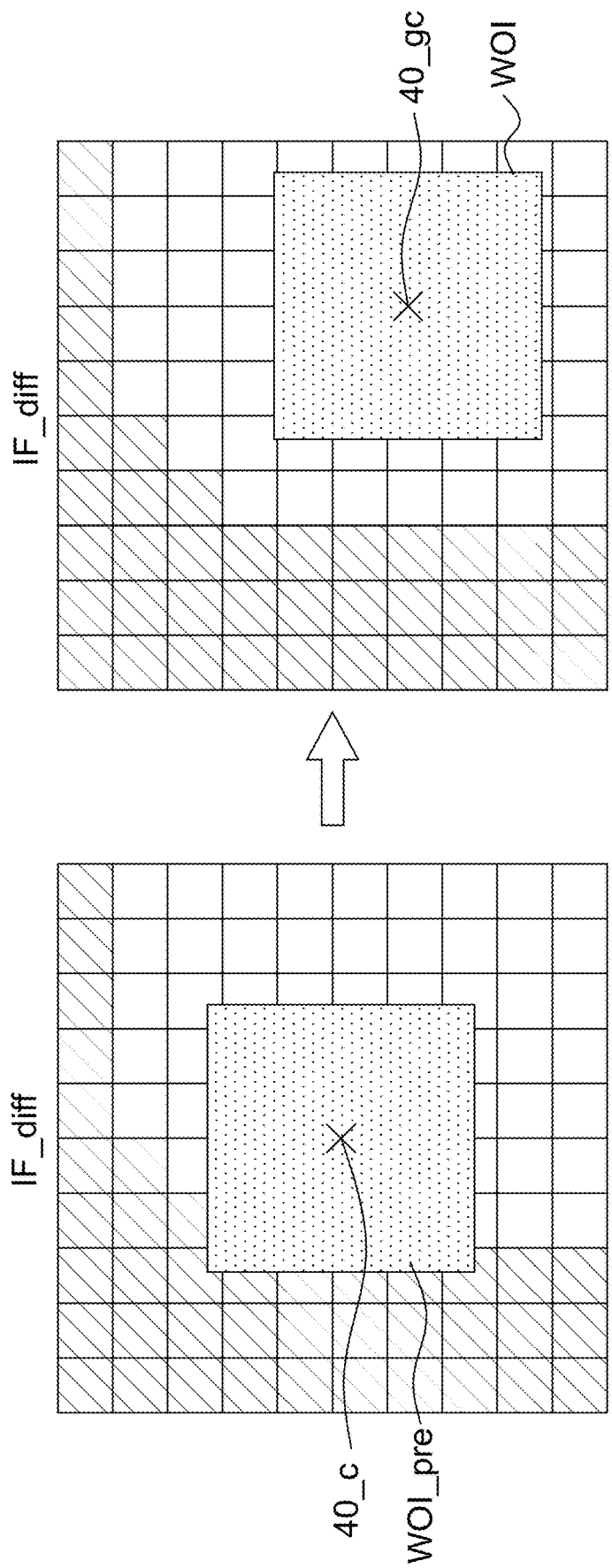
FIG. 4A is a schematic diagram of determining a single window of interest by a finger detection device according to one embodiment of the present disclosure.

Please refer to FIG. 4A, the processor 15 respectively determines a single WOI corresponding to the different functions as the different WOIs according to a gravity center 40_gc of the finger region (or the covered region R_cov) and a predetermined pixel distance (e.g., from the gravity center 40_gc).

Figure 4B:
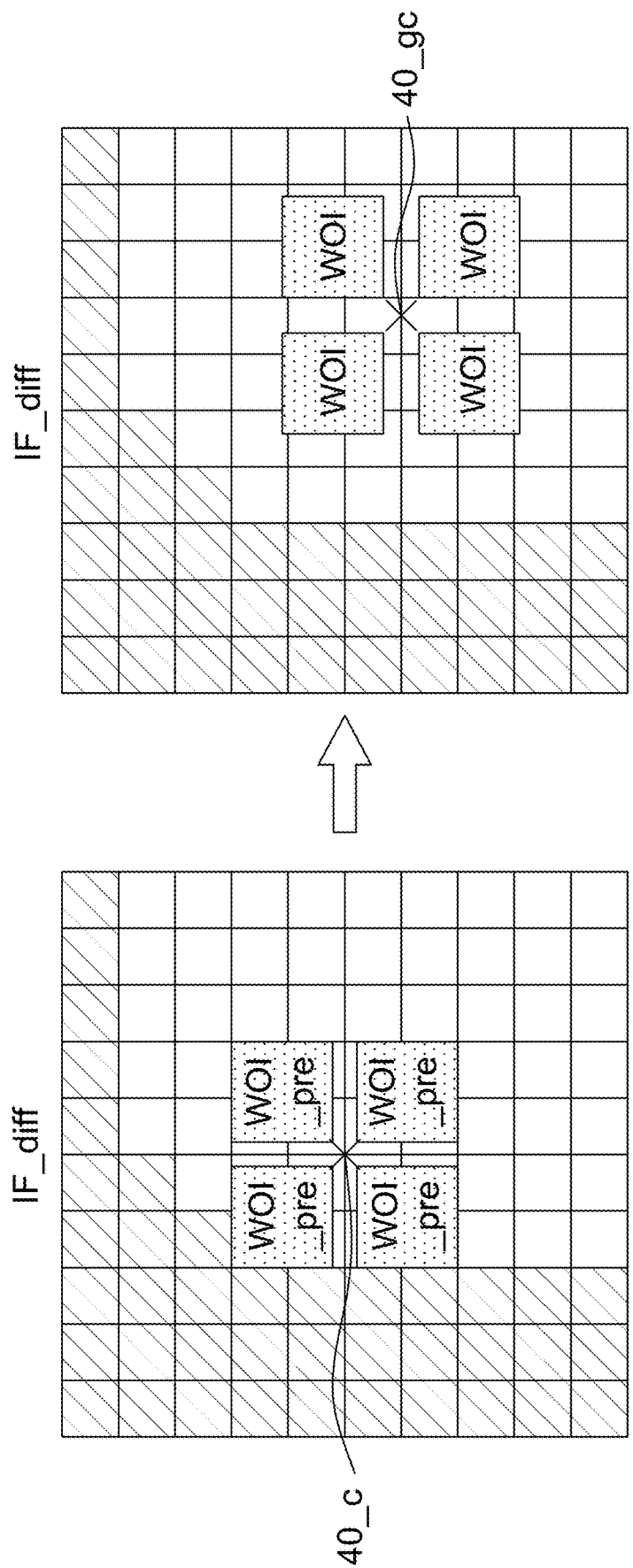
FIG. 4B is a schematic diagram of determining multiple windows of interest by a finger detection device according to one embodiment of the present disclosure.
Figure 4C:
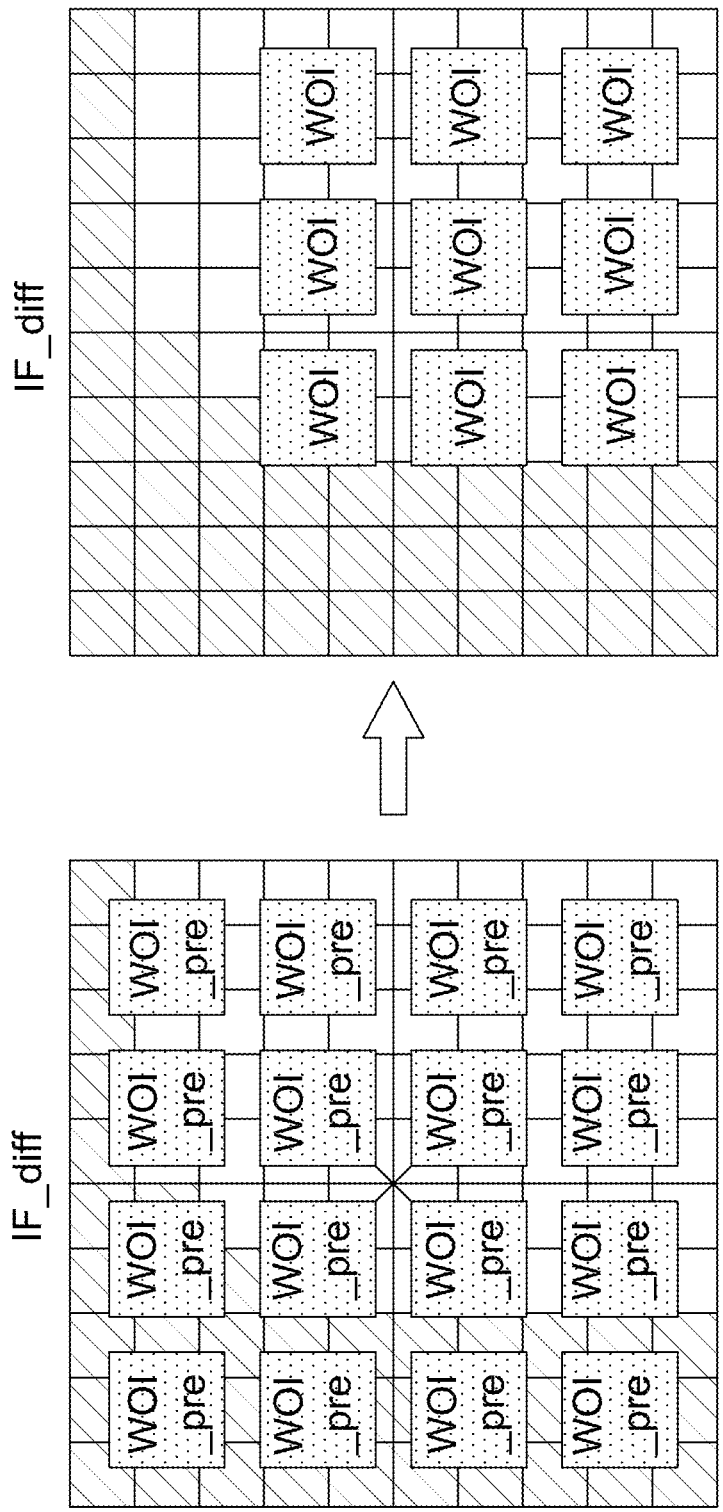
FIG. 4C is another schematic diagram of determining multiple windows of interest by a finger detection device according to one embodiment of the present disclosure.

Please refer to FIGS. 4B and 4C, the processor 15 respectively determines multiple WOIs corresponding to the different functions as the different WOIs according to a gravity center 40_gc of the finger region (or the covered region R_cov) and different quadrants surrounding the gravity center 40_gc. For example, four WOIs are shown in FIG. 4B, and eight WOIs are shown in FIG. 4C, but the numbers of WOIs are not limited to four and eight.

In one aspect, the processor 15 determines (e.g., by accessing memory) a single WOI_pre according to a center 40_c of the differential image IF_diff and a predetermined distance from the gravity center 40_c, e.g., left diagram in FIG. 4A; or determines (e.g., by accessing memory) multiple WOI_pre according to a center 40_c of the differential image IF_diff and different quadrants surrounding the center 40_c, e.g., left diagram in FIG. 4B. After the finger region is determined, the processor 15 moves the WOI_pre corresponding to the different functions in the differential image frame IF_diff to be within the finger region (e.g., from left diagrams to right diagrams in FIGS. 4A and 4B) as the different WOIs.

In a further aspect, the processor 15 determines (e.g., by accessing memory) multiple predetermined WOI_pre in the differential image frame IF_diff, e.g., left diagram in FIG. 4C. The processor 15 selects a part of WOIs (e.g., right diagram in FIG. 4C), which are within the finger region in the differential image frame IF_diff, among the multiple predetermined WOI_pre corresponding to the different functions in the differential image frame IF_diff as the different WOIs. That is, the different WOIs exclude the predetermined WOI_pre outside the finger region (or the covered region R_cov).

In the aspect using multiple windows of interest, the processor 15 selects one WOI or multiple WOIs having the largest feature values (e.g., including the maximum brightness, standard deviation of brightness, maximum difference of brightness, standard deviation of brightness difference and maximum spectral power mentioned above) for the post-processing. Or, the processor 15 calculates and outputs a weighted summation of the calculated results of the different WOIs. For example, the WOI having higher feature value is multiplied by a higher weighting. That is, it is possible not to use all of the multiple WOIs.

After the WOI(s) is determined, the processor 15 outputs the image frame (before or after image differencing) to a post-processor of the electronic device 80. The post-processor uses pixel data and/or information of the WOI(s) for the different functions. The post-processor is a microcontroller unit (MCU) or a central processing unit (CPU) of the electronic device 80.

It should be mentioned that although FIGS. 4A to 4C show that the predetermined window of interest WOI_pre and the window of interest WOI have a rectangular shape, the present disclosure is not limited thereto. The predetermined window of interest WOI_pre and the window of interest WOI are arranged to have other shapes such as circular shape, oval shape, diamond shape or triangular shape without particular limitations.

It should be mentioned that the values, e.g., the size of image frame, the size and number of WIOs and the pixel number of pixel region/block as well as the spatial relationship in the present disclosure and drawings are only intended to illustrate but not to limit the present disclosure.

In the present disclosure, because the electronic device 80 performs the post-processing after finger detection device 100 confirms the existence of a finger region, the finger detection device 100 outputs or does not output the image frame to the electronic device 80 during operation.

In the present disclosure, the finger detection device 100 is arranged to dynamically determine WOI, and to output pixel data only within the WOI to the electronic device 80. The amount of the pixel data being outputted varies corresponding to a size of the determined WOI.

In the present disclosure, the finger detection device 100 is arranged to dynamically determine WOI, and to output the whole image frame (image frame before or after differencing), in which only the determined WOI contains original pixel data, to the electronic device 80.

In the present disclosure, the finger detection device 100 is arranged to dynamically determine WOI. The finger detection device 100 outputs the whole image frame (image frame before or after differencing) and information describing the determined WOI to the electronic device 80.

As mentioned above, in conventional finger detection devices, it is required to capture different image frames using different capturing parameters and at different times so as to perform different control functions. In addition, how to eliminate the interference from ambient light is also an issue to determine the control accuracy. Accordingly, the present disclosure further provides a finger detection device (e.g., referring to FIG. 1) and an operating method thereof (e.g., referring to FIGS. 2 to 3) that firstly determine whether a covered region has a specific material (e.g., finger material) so as to determine whether to output an image frame. Furthermore, the present finger detection device determines at least one window of interest, corresponding to different control functions, in the image frame having the specific material such that the same image frame can be used to perform different control functions with accurate control of an electronic device.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A finger detection device, comprising:
    a light source, configured to emit light toward a sensing surface of the finger detection device;
    a light sensor, configured to acquire a first image frame and a second image frame toward the sensing surface; and
    a processor, configured to
        calculate a difference of the first image frame and the second image frame to generate a differential image frame,
        identify a finger region in the differential image frame, and
        determine different windows of interest (WOIs) corresponding to different functions upon identifying the finger region.

2. The finger detection device as claimed in claim 1, wherein the different functions comprise a fingerprint detection, a navigation detection and a photoplethysmography (PPG) detection.

3. The finger detection device as claimed in claim 2, wherein
    in the fingerprint detection, the processor is configured to
        determine at least one corresponding WOI according to at least one of a number of minutiae, a directional spectrum and a spatial frequency value in the finger region, in the navigation detection, the processor is configured to determine at least one corresponding WOI according to at least one of a standard deviation of brightness and power of a specific spatial spectrum in the finger region, and in the PPG detection, the processor is configured to determine at least one corresponding WOI according to at least one of an average brightness, a standard deviation of brightness in time-domain and a spectral power of brightness in time-domain in the finger region.

4. The finger detection device as claimed in claim 1, wherein the light source is turned on when the light sensor acquires the first image frame, and the light source is turned off when the light sensor acquires the second image frame.

5. The finger detection device as claimed in claim 4, wherein the light sensor is configured to acquire the first image frame and the second image frame using a first exposure time, and to acquire another first image frame and another second image frame using a second exposure time, different from the first exposure time, and the processor is configured to calculate a first differential image frame of the first image frame and the second image frame, calculate a second differential image frame of the another first image frame and the another second image frame, and calculate a weighted summation of the first differential image frame and the second differential image frame as the differential image frame.

6. The finger detection device as claimed in claim 4, wherein the light sensor is configured to acquire the first image frame and the second image frame using a first exposure time, and the processor is configured to calculate a first differential image frame of the first image frame and the second image frame, decrease or increase the first exposure time to a second exposure time to acquire another first image frame and another second image frame upon identifying that the first differential image frame has over-exposure or under-exposure, and calculate a second differential image frame of the another first image frame and the another second image frame as the differential image frame.

7. The finger detection device as claimed in claim 1, wherein the processor is configured to respectively determine a single WOI corresponding to the different functions as the different WOIs according to a gravity center of the finger region and a predetermined pixel distance from the gravity center.

8. The finger detection device as claimed in claim 1, wherein the processor is configured to respectively determine multiple WOIs corresponding to the different functions as the different WOIs according to a gravity center of the finger region and different quadrants surrounding the gravity center.

9. The finger detection device as claimed in claim 1, wherein the processor is configured to move predetermined WOIs in the differential image frame corresponding to the different functions to be within the finger region as the different WOIs.

10. The finger detection device as claimed in claim 1, wherein the processor is configured to select a part of WOIs, which are within the finger region in the differential image frame, among multiple predetermined WOIs in the differential image frame corresponding to the different functions as the different WOIs.

11. The finger detection device as claimed in claim 1, wherein the finger detection device is configured to output a whole image frame, in which only the different WOIs contain original pixel data, acquired by the light sensor.

12. The finger detection device as claimed in claim 1, wherein the finger detection device is configured to output a whole image frame acquired by the light sensor and information describing the different WOIs.

13. An operating method of a finger detection device, the finger detection device including a light source, a light sensor and a processor, the operating method comprising:

acquiring, using the light sensor, a first image frame and a second image frame corresponding to different illuminations of the light source;

identifying, using the processor, a predetermined material of a covered region in a differential image frame of the first image frame and the second image frame; and performing a fingerprint detection function and a PPG detection function according to the covered region in the same differential image frame upon identifying the predetermined material.

14. The operating method as claimed in claim 13, wherein upon identifying the predetermined material, the operating method further comprises:

determining at least one WOI corresponding to the fingerprint detection function according to at least one of a number of minutiae, a directional spectrum and a spatial frequency value in the covered region.

15. The operating method as claimed in claim 14, further comprising:

outputting pixel data only within the determined WOI of an image frame acquired by the light sensor, wherein amount of the pixel data varies corresponding to a size of the determined WOI.

16. The operating method as claimed in claim 13, wherein upon identifying the predetermined material, the operating method further comprises:

determining at least one WOI corresponding to the PPG detection function according to at least one of an average brightness, a standard deviation of brightness in time-domain and a spectral power of brightness in time-domain in the covered region.

17. The operating method as claimed in claim 16, further comprising:

outputting pixel data only within the determined WOI of an image frame acquired by the light sensor, wherein amount of the pixel data varies corresponding to a size of the determined WOI.

18. The operating method as claimed in claim 13, further comprising:

identifying the predetermined material according to at least one of a maximum brightness, a standard deviation of brightness, a maximum difference of brightness, a standard deviation of brightness difference and a maximum spectral power of multiple pixel blocks in the covered region.

19. The operating method as claimed in claim 13, further comprising:
controlling the light sensor to perform auto exposure according to pixel gray levels in the covered region but ignoring pixel gray levels outside the covered region.

20. A finger detection device, comprising:
a light source, configured to emit light toward a sensing surface of the finger detection device;
a light sensor, configured to acquire a first image frame and a second image frame toward the sensing surface; and
a processor, configured to
  calculate a difference of the first image frame and the second image frame to generate a differential image frame,
  identify a finger region in the differential image frame, and
  output different amount of pixel data of image frames acquired by the light sensor corresponding to different functions upon identifying the finger region.

* * * * *